350-427                    SR
         OR    3,610,733

[11] 3,610,733

| [72] | Inventor | Frank G. Back |
| | | 55 Sea Cliff Ave., Glen Cove, N.Y. 11542 |
| [21] | Appl. No. | 68,360 |
| [22] | Filed | Aug. 31, 1970 |
| [45] | Patented | Oct. 5, 1971 |

[54] VARIFOCAL LENS SYSTEM AND ACTUATING MECHANISM
8 Claims, 8 Drawing Figs.

[52] U.S. Cl. .................................... 350/186, 95/45, 350/187
[51] Int. Cl. .................................... G02b 7/04, G02b 15/14
[50] Field of Search ........................ 350/187, 184, 186; 95/45

[56]              References Cited
              UNITED STATES PATENTS
2,720,817  10/1955  Mills .......................... 350/187
3,533,344  10/1970  Thomas ...................... 350/187 X

*Primary Examiner* — John K. Corbin
*Attorney* — Albert F. Kronman

ABSTRACT: The movable elements of a completely color-corrected varifocal lens system are carried upon elongated rods within a combined lens support and actuating mechanism whereby problems of internal reflections and vignetting are eliminated while reducing the overall dimensions of the assembly. The shape of the lens-controlling cams is such that the cam followers do not change direction throughout the entire range thereby eliminating "jump" of the image.

INVENTOR
FRANK G. BACK

Albert F. Kroman
ATTORNEY

INVENTOR
FRANK G. BACK

ATTORNEY

INVENTOR
FRANK G. BACK

ATTORNEY

VARIFOCAL LENS SYSTEM AND ACTUATING MECHANISM

BACKGROUND OF THE INVENTION

Varifocal lens systems and particularly remote-controlled lenses such as are used in closed circuit television are well known. Such lens systems, however, have heretofore suffered from the presence of uncorrected color aberration, spherical aberration, coma and other optical deficiencies which made them particularly unsatisfactory in black and white work. In addition, movement was imparted to the lens elements by a series of concentric barrels which not only took up a relatively large amount of space, and required substantial power to drive, but also gave rise to internal reflections and vignetting particularly when the lens assembly was in the wide-open position.

It is an object of the present invention to provide a varifocal lens assembly which is substantially free of color aberration over its entire range.

Another object of the present invention is to provide a varifocal lens assembly without distortion, coma or other optical shortcomings throughout its entire range.

A further object of the present invention is to provide a lens supporting and transporting structure for a varifocal lens assembly which will greatly reduce the overall size of the assembly without producing image jump, internal reflections or vignetting.

SUMMARY OF THE DISCLOSURE U

A varifocal lens system of compact design and substantially free of all optical deficiencies such as color aberration, coma and spherical aberration is carried within a housing. The movable lens elements are mounted within spiders which are slideably carried upon rods within the housing. The use of rods to carry the lens elements makes it possible to reduce the size of the assembly without creating internal reflections or vignetting.

The spiders are provided with cam followers which ride in helical cam slots. The design of the optical system is such that the followers travel in only one direction and bear against only one cam surface throughout the range of the lens.

In the accompanying drawings, forming a part hereof there is illustrated one embodiment of the invention in which drawings, similar reference characters designate corresponding parts and in which:

DESCRIPTION OF THE DRAWINGS G

FIG. 1 is a view in side elevation on a reduced scale of the varifocal lens assembly shown in FIG. 2, FIG. 2 is a longitudinal view partly broken away of a complete embodiment of the present invention, FIG. 3 is a cross-sectional view taken on line 3—3 in FIG. 2, FIG. 4 is a cross-sectional view taken on line 4—4 in FIG. 2, FIGS. 5 and 6 illustrate the lens elements of a varifocal lens system according to the present invention, FIG. 7 is a cross-sectional view taken on line 7—7 in FIG. 2 looking in the direction of the arrows, FIG. 8 is a cross-sectional view taken on line 8—8 in FIG. 2 looking in the direction of the arrows.

DESCRIPTION OF A PREFERRED EMBODIMENT OF THE INVENTION

Figure 1:
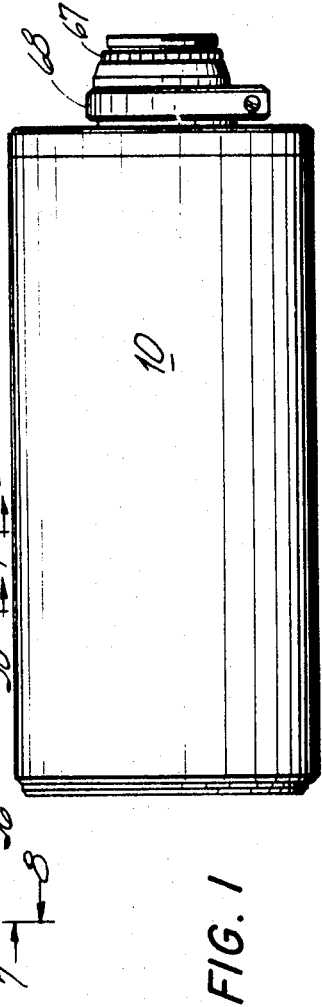
Figure 2:
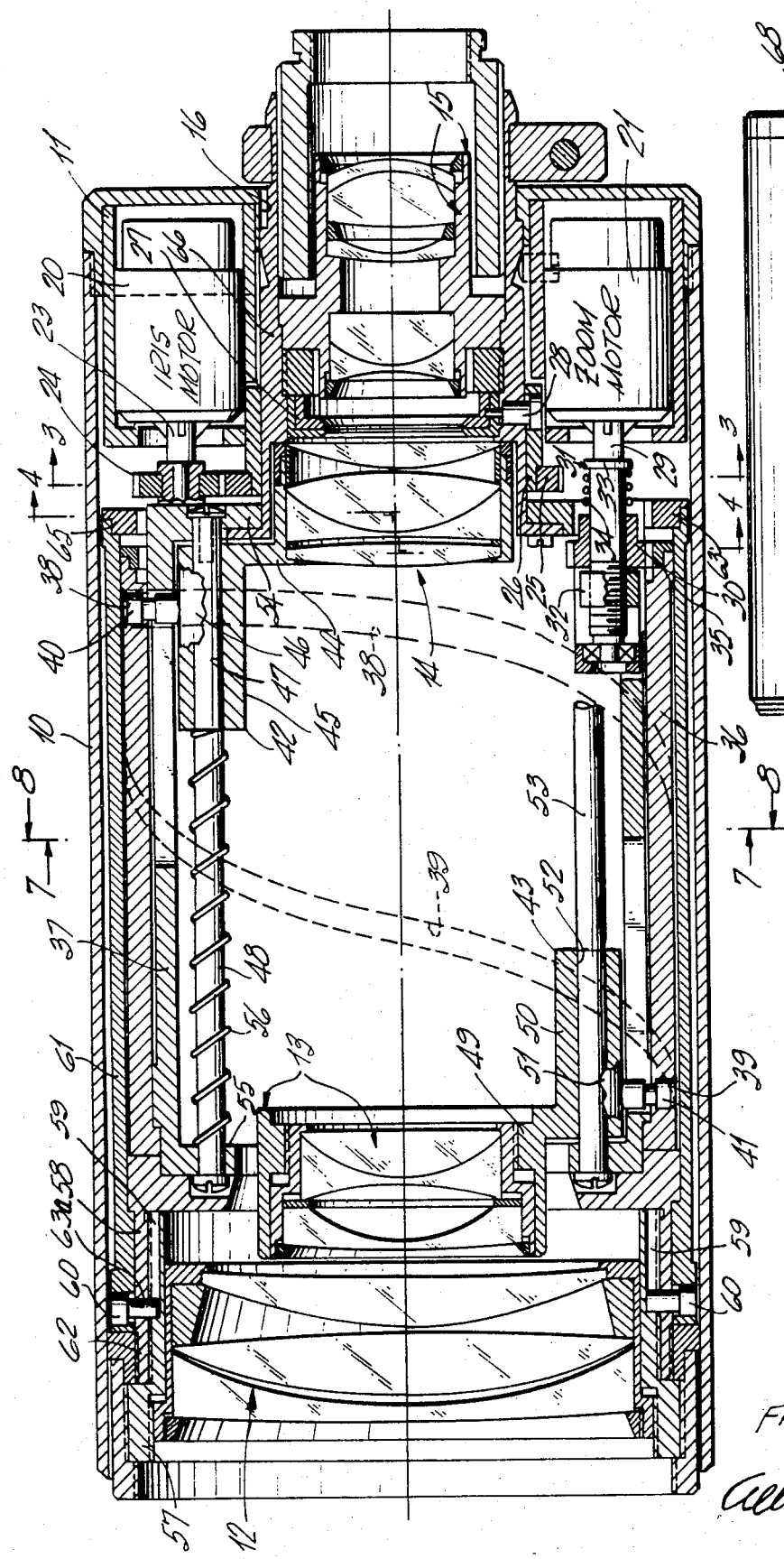

Referring to FIGS. 1–4 there is shown one embodiment of the present invention, particularly suited for remote-controlled applications such as closed circuit television systems. In said figures, 10 indicates a cylindrical housing having a ring-shaped chassis 11 at one end and a front lens assembly 12 at the opposite end. A variator lens assembly 13 and a compensator lens assembly 14 are movably carried within the housing in a manner hereinafter more fully described.

The relay lens assembly 15 is secured within an opening 16 in the ring chassis 11. The ring chassis 11 may be removed from the housing 10 without disturbing the relay lens assembly or any of the other lens elements.

Figure 3:
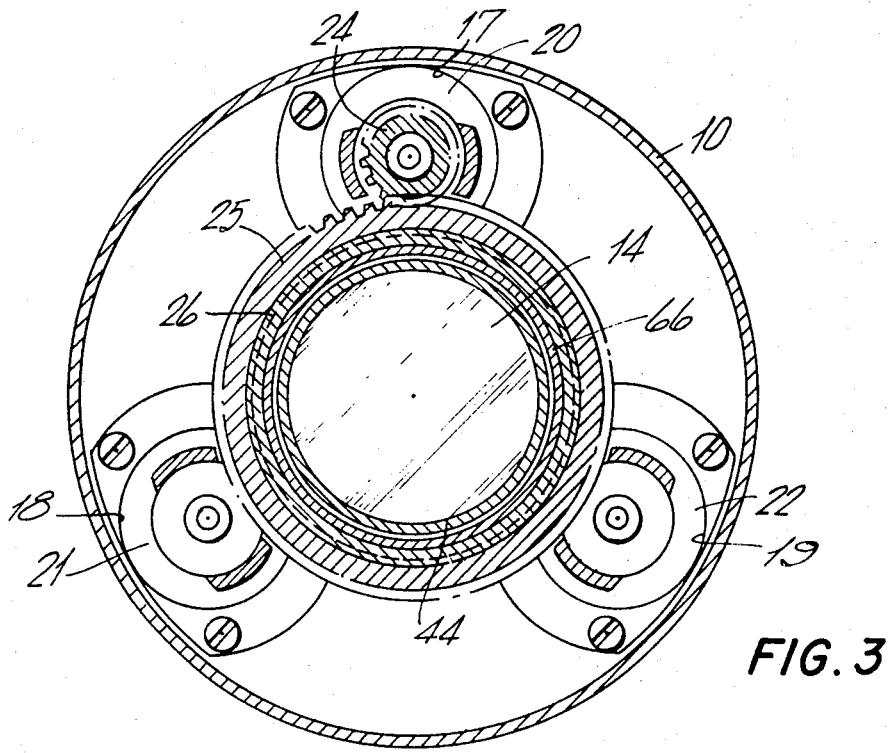
Figure 4:
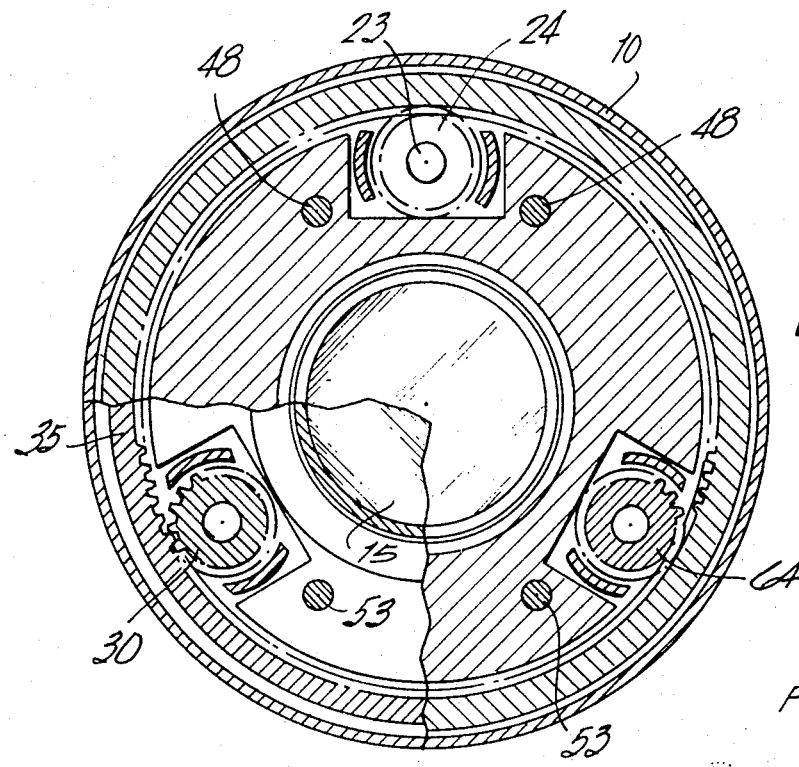

The ring chassis 11 is provided with three openings indicated at 17, 18 and 19 in FIG. 3 between the relay opening 16 and the ring chassis periphery. Each of the openings 17, 18, and 19 are formed to receive a small reversible motor 20, 21, 22, hereinafter referred to as the iris motor, zoom motor and focusing motor respectively.

Attached to the output shaft 23 of the iris motor 20 is a small spur gear 24. The spur gear 24 is in mesh with and drives a larger spur gear 25 secured to a sleeve 26. As the sleeve 26 is rotated by the action of the motor 20 and gears 24, 25, it opens and closes an iris 27 by means of a pin 28 carried by the sleeve 26.

The output shaft 29 of zoom motor 21 drives a spur gear 30 freely carried thereon, by means of an overrunning clutch 31 consisting of a nut 32 on the shaft 29 against which the gear 30 bears, a collar 33 on the shaft and a coil spring 34. The coil spring 34 urges the gear 30 into frictional contact with the nut 32.

Motion from the spur gear 30 is transferred to an internal gear 35 with which the spur gear meshes. The internal gear 35 is secured to one end of an elongated barrel 36, hereinafter referred to as the cam barrel, which is freely carried upon an inner housing 37. Helically shaped grooves 38, 39 are cut into the inner wall of the cam barrel 36 and serve as cam guides for the followers 40, 41. Cam followers 40, 41 are secured to spiders 42, 43 respectively.

It will be seen that the cam followers 40, 41 move in only one direction throughout the range of the lens assembly. This operation is contrary to prior art devices wherein the direction of travel is suddenly reversed thereby causing image jump.

Figure 7:
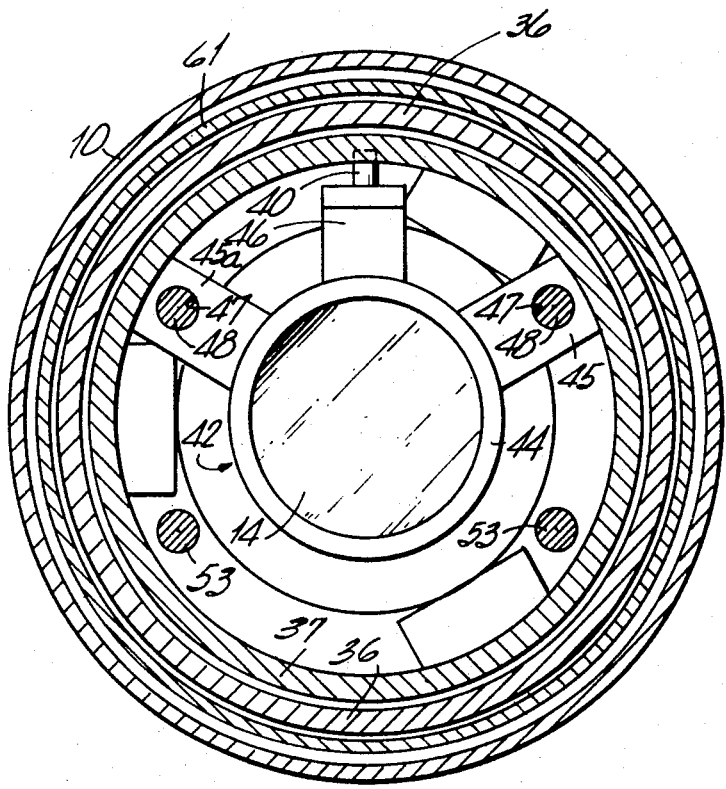

The spider 42, hereinafter called the compensator spider, consists of a short tubular lens support 44 within which the compensator lens assembly 14 is carried and three extending arms, 45, 45a, and 46, as shown in FIG. 7. The outermost of the three arms are longitudinally bored as indicated at 47 in FIG. 7 to receive spaced rods 48. The central arm 46 in the compensator spider 42 carries the cam follower 40. The outer arms are spaced 120° apart for greater stability and smooth operation.

Figure 8:
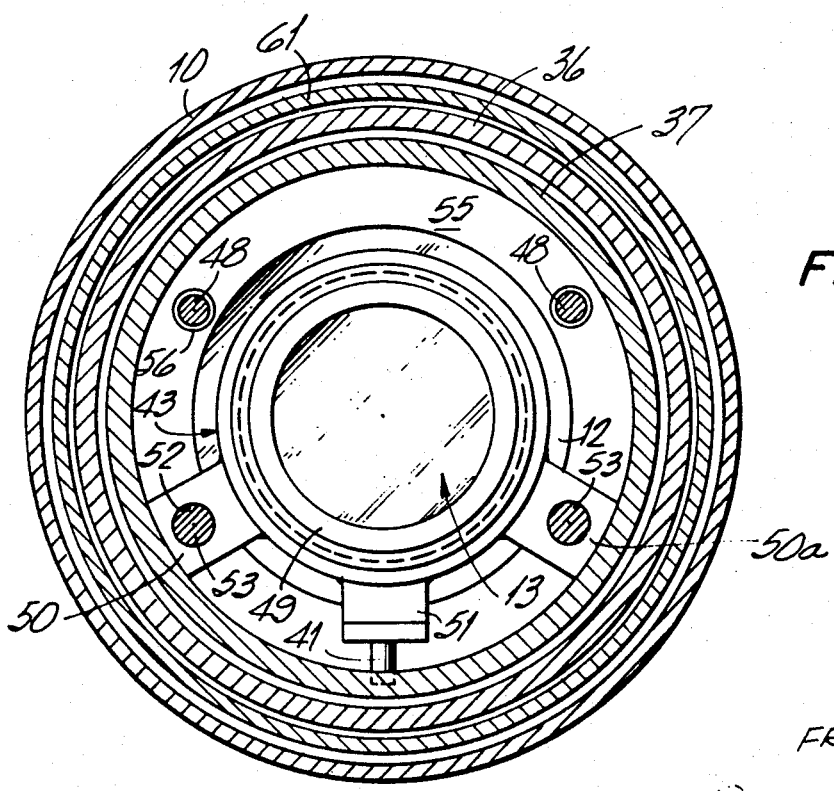

The second spider 43 (see FIG. 8) hereinafter called the variator spider also consists of a short tubular lens support 49 within which the variator lens assembly 13 is carried and three outwardly extending arms, 50, 50a and 51. Here again, the outer of the three arms 50, 50a are longitudinally bored as indicated at 52 to receive spaced rods 53. The central arm 51 carries the cam follower 41 which travels within the helical cam groove 39 as the cam barrel 36 is rotated.

The rods 48, 53 are secured at each end to the end walls 54, 55 of the inner housing 37 spaced from, but parallel to each other and the optical axis of the lens system. The rods 48, 53 thus permit the spiders 42, 43 and consequently the variator and compensator to be moved within the housings 10, 37 without the need for space-consuming telescoping sleeves or barrels. A coil spring 56 is disposed around each of the rods 48 between the outer arms thereon and the end wall 55. The coil spring is under compression and further reduces play between the cam groove 38 and the follower 40. The follower thus works only against one side of the cam groove 38. Coil springs around rods 53 have been omitted for the sake of clarity.

The front lens assembly 12 is carried by a ring-shaped mount 57 threaded into a tubular extension 58 of the end wall 55. Opposed elongated slots 59 are provided in the periphery of the mount 57 to receive pins 60. The pins 60 are secured to an elongated tube 61 and extend through a fixed ring 62 into the slots 59. The ring 62 is formed with annular openings 63a to permit the pins 62 to rotate the front lens mount 57 for focusing purposes.

The focusing tube 61 is rotated by the focusing motor 22 which turns a small spur gear 64 in mesh with a larger internal gear 63. The internal gear 63 is press fitted into the focusing tube 61 as indicated at 65.

The relay lens assembly 15 is fixed and carried within a barrel 66 which is secured to the end wall 54 and extends outwardly through the opening 16 in the ring-shaped chassis 11.

The varifocal lens system is secured to a camera such as a television camera (not shown) by an adapter 67 (se FIg. 1) nd a clamp 68.

It will be apparent from the foregoing that the varifocal lens system can be controlled by means of simple switching devices well known in the art which energize or reverse the polarity of the motors 20, 21, 22 to focus, zoom or control the iris diaphragm. The use of the rods 48, 53 of relatively small diameter instead of the telescoping barrels not only eliminates vignetting and internal reflections but also makes additional space available for mounting drive motors and gears.

Figure 5:
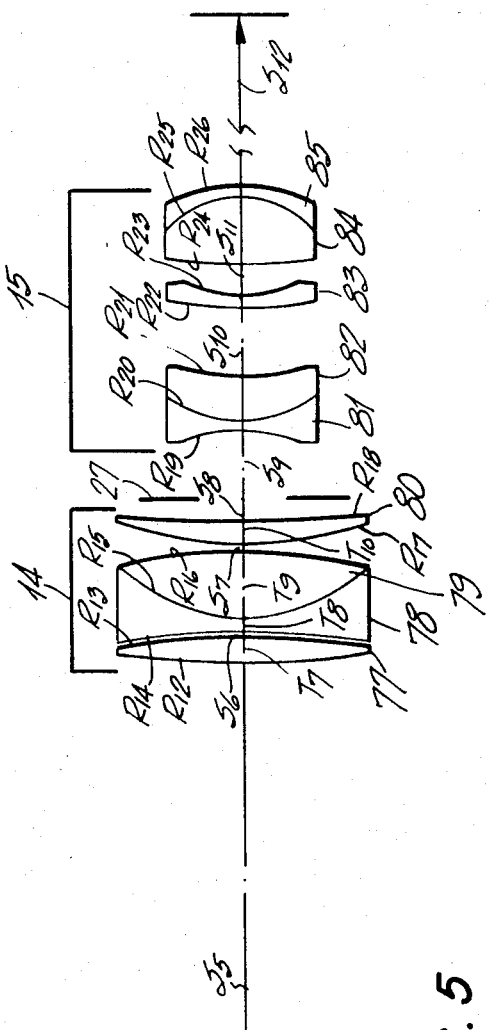
Figure 5:
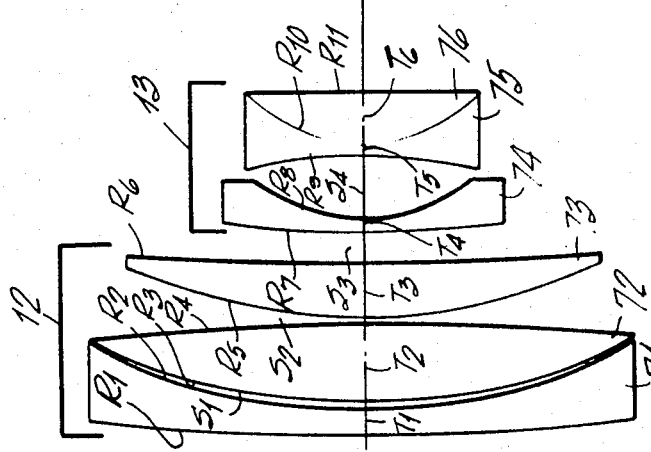
Figure 6:
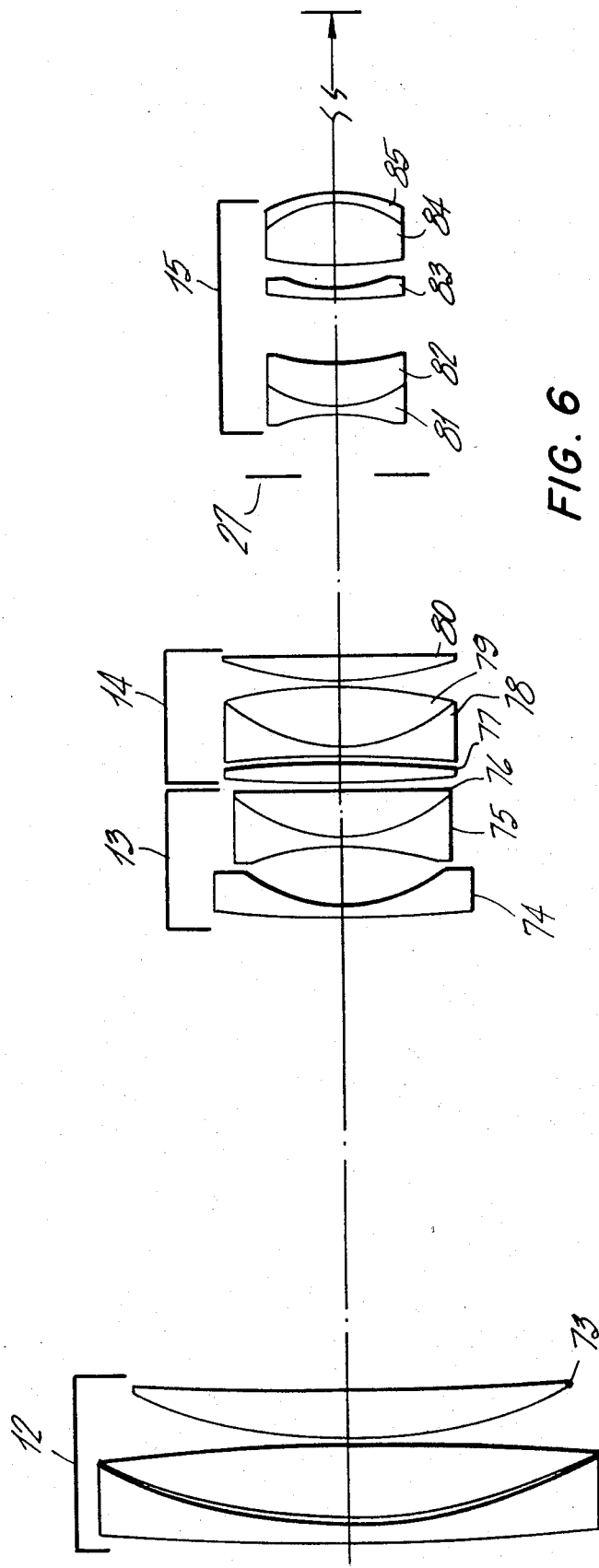

Referring to FIGS. 5 and 6 there is illustrated somewhat diagrammatically the varifocal lens system according to the present invention in the two extremes of travel of the variator lens assembly 13 and the compensator lens assembly 14. The lens system is fully corrected over its entire range for distortion, color aberration both longitudinal and lateral, spherical aberration and coma. The optical characteristics of the lens system according to the present invention are set forth in the following table with plus and minus values of R indicating curved surfaces which are respectively convex and concave toward the front:

| Lens No. | Radius (R), mm. | Thickness (T), air spacing(s) | Glass cat. ref. | Index No., Nd | Dispersion, V |
|---|---|---|---|---|---|
| FRONT LENS | | | | | |
| 71 | $R_1 = +1,732.27$ | $t_1 = 2.50$ | SF 15 | 1.69895 | 30.07 |
|    | $R_2 = +72.06$    | $s_1 = 0.50$ |       |         |       |
| 72 | $R_3 = +78.05$    | $t_2 = 9.00$ | SK 16 | 1.62041 | 60.33 |
|    | $R_4 = -328.03$   | $s_2 = 0.20$ |       |         |       |
| 73 | $R_5 = +66.71$    | $t_3 = 6.80$ | SK 16 | 1.6204  | 60.33 |
|    | $R_6 = +656.22$   | $s_3 = 3.69$ |       |         |       |
| VARIATOR | | | | | |
| 74 | $R_7 = +195.96$   | $t_4 = 1.50$ | LaK 8 | 1.71300 | 53.83 |
|    | $R_8 = +20.97$    | $s_4 = 7.00$ |       |         |       |
| 75 | $R_9 = -38.30$    | $t_5 = 1.30$ | SK 5  | 1.58913 | 61.27 |
| 76 | $R_{10} = +20.97$ | $t_6 = 6.00$ | SK 15 | 1.69895 | 30.07 |
|    | $R_{11} = +691.98$| $s_5 = 74.94$|       |         |       |
| COMPENSATOR | | | | | |
| 77 | $R_{12} = +102.42$ | $t_7 = 3.00$ | SF 15 | 1.69895 | 30.07 |
|    | $R_{13} = -196.01$ | $s_6 = 0.50$ |       |         |       |
|    | $R_{14} = -300.96$ |              |       |         |       |
| 78 | $R_{15} = +21.91$  | $t_8 = 1.20$ | SF 15 | 1.69895 | 30.07 |
| 79 | $R_{16} = -48.00$  | $t_9 = 7.90$ | LaK 11| 1.65830 | 57.26 |
|    |                    | $s_7 = 0.10$ |       |         |       |
|    | $R_{17} = +39.41$  |              |       |         |       |
| 80 | $R_{18} = +291.66$ | $t_{10} = 3.20$ | SK 16 | 1.62041 | 60.33 |
|    |                    | $s_8 = 2.22$ |       |         |       |
| IRIS |                  | $s_9 = 7.00$ |       |         |       |
| RELAY | | | | | |
| 81 | $R_{19} = -28.45$  | $t_{11} = 1.20$ | KF 3  | 1.51454 | 54.70 |
|    | $R_{20} = +12.73$  |              |       |         |       |
| 82 | $R_{21} = +49.94$  | $t_{12} = 6.00$ | F 7   | 1.62536 | 35.56 |
|    | $R_{22} = +54.94$  | $s_{10} = 7.50$ |       |         |       |
| 83 | $R_{23} = +17.97$  | $t_{13} = 1.50$ | SF 15 | 1.69895 | 30.07 |
|    |                    | $s_{11} = 3.00$ |       |         |       |
|    | $R_{24} = +82.05$  |              |       |         |       |
| 84 | $R_{25} = -12.73$  | $t_{14} = 7.00$ | LaKN 9 | 1.69100 | 54.71 |
| 85 | $R_{26} = -20.97$  | $t_{15} = 1.20$ | SF 10 | 1.72025 | 28.41 |
|    |                    | $s_{12} = 30.35$ |       |         |       |
| EFL = 15–150 mm. | | | | | |

NOTE: SF=Dense Flint; F=Flint; SK=Dense Crown; LaK=Lanthanum Crown; KF=Crown Flint; Nd=Index of refraction for d light.

From the foregoing it will be seen that there has been provided a powered varifocal lens assembly of greatly reduced size and superior optical performance. The construction of the ring-shaped motor chassis makes it possible to remove the motors without disturbing the alignment of the optical elements while the elimination of a multiplicity of interior barrels tough the use of the supporting rods eliminates internal reflections and prevents vignetting.

Having thus fully described the invention, what is claimed as new and desired to be secured by Letters Patent of the United States, is:

1. A powered varifocal lens assembly comprising an elongated hollow outer cylindrical housing, a ring-shaped motor chassis at one end of the outer housing, a plurality of motors carried by said chassis, a front lens assembly carried at the opposite end of said outer housing, an inner housing within the outer housing, spaced from and concentric with the outer housing, a first and a second set of spaced longitudinal elongated rods carried by the inner housing parallel with each other and the walls of the inner housing, a variation assembly slideably carried upon the first set of rods, a compensator assembly slideably cried upon the second set of rods, a cam barrel between the inner and outer housings, cam grooves within the cam barrel, cam followers carried by the variator assembly and the compensator assembly and received within the cam grooves, a relay assembly carried within the central opening of the ring-shaped motor chassis, an iris assembly between the compensator assembly and the relay, mans including one of the motors and the cam barrel to move the variator assembly and compensator assembly along the rods to vary the focal length, means including a second of the motors to operate the iris assembly, and means including third motor to move the front lens assembly axially within the outer housing to focus the varifocal ls assembly.

2. A device according to claim 1 in which the variator and compensator assemblies each include a spider within which the variator and compensator lenses are respectively carried, at last three outwardly extending spaced arms on each of said spiders, two of said arms being bored to receive the elongated rods therethrough and the third arm having the cam follower therein.

3. A device according to claim 1 in which a focusing barrel is disposed between the inner and outer housing, at least one pin is carried by the said focusing barrel coupled to the front lens assembly and the third motor is driveably coupled to the focusing barrel.

4. A device according to claim 2 in which a coil spring under compression is disposed around each of the elongated rods passing through the compensator assembly spider to eliminate play between the follower and the cam groove.

5. A device according to claim 2 in which the inner housing is provided with opposed centrally bored end walls adjacent to front lens and motor chassis respectively within which the elongated rods are secured and the relay lens assembly is carried within an elongated barrel secured to the end wall opening adjacent the motor chassis extending through said chassis.

6. A device according to claim 2 in which the cam barrel moving means comprises a reversible motor, an output shaft on said motor, a gear carried upon said output shaft, an internal gear secured to the cam barrel in mesh with the output shaft gear and a clutch between the output shaft and the said output shaft gear.

7. A device according to claim 1 in which the lenses have the following optical characteristics:

| Lens No. | Radius (R), mm. | Thickness (t), air spacing (s) | Glass cat. ref. | Index No., Nd | Dispersion, V |
|---|---|---|---|---|---|
| FRONT LENS | | | | | |
| 71 | $R_1 = +1,732.27$ | $t_1 = 2.50$ | SF 15 | 1.69895 | 30.07 |
|    | $R_2 = +72.06$    | $s_1 = 0.50$ |       |         |       |
| 72 | $R_3 = +78.05$    | $t_2 = 9.00$ | SK 16 | 1.62041 | 60.33 |
|    | $R_4 = -328.03$   | $s_2 = 0.20$ |       |         |       |
| 73 | $R_5 = +66.71$    | $t_3 = 6.80$ | SK 16 | 1.6204  | 60.33 |
|    | $R_6 = +656.22$   | $s_3 = 3.69$ |       |         |       |

Table — Continued

| Lens No. | Radius (R), mm. | Thickness (t), air spacing (s) | Glass cat. ref. | Index No., Nd | Dispersion, V |
|---|---|---|---|---|---|
| VARIATOR | | | | | |
| 74 | $R_7=+195.96$ | $t_4=1.50$ | LaK 8 | 1.71300 | 53.83 |
|    | $R_8=+20.97$  | $s_4=7.00$ |       |         |       |
| 75 | $R_9=-38.80$  | $t_5=1.30$ | SK 5  | 1.58913 | 61.27 |
|    | $R_{10}=+20.97$ |          |       |         |       |
| 76 | $R_{11}=+691.98$ | $t_6=6.00$ | SK 15 | 1.69895 | 30.07 |
|    |               | $s_5=74.94$ |       |         |       |
| COMPENSATOR | | | | | |
| 77 | $R_{12}=+102.42$ | $t_7=3.00$ | SF 15 | 1.69895 | 30.07 |
|    | $R_{13}=-196.01$ | $s_6=0.50$ |       |         |       |
| 78 | $R_{14}=-300.96$ | $t_8=1.20$ | SF 15 | 1.69895 | 30.07 |
|    | $R_{15}=+21.91$  |            |       |         |       |
| 79 | $R_{16}=-48.00$  | $t_9=7.90$ | LaK 11 | 1.65830 | 57.26 |
|    | $R_{17}=+39.41$  | $s_7=0.10$ |       |         |       |
| 80 | $R_{18}=+291.66$ | $t_{10}=3.20$ | SK 16 | 1.62041 | 60.33 |
| IRIS |              | $s_8=2.22$ |       |         |       |
|      |              | $s_9=7.00$ |       |         |       |

Table — Continued

| Lens No. | Radius (R), mm. | Thickness (T), air spacing (s) | Glass cat. ref. | Index No., Nd | Dispersion, V |
|---|---|---|---|---|---|
| RELAY | | | | | |
| 81 | $R_{19}=-28.45$ | $t_{11}=1.20$ | KF 3 | 1.51454 | 54.70 |
|    | $R_{20}=+12.73$ |              |      |         |       |
| 82 | $R_{21}=+49.94$ | $t_{12}=6.00$ | F 7  | 1.62536 | 35.56 |
|    | $R_{22}=+54.94$ | $s_{10}=7.50$ |      |         |       |
| 83 | $R_{23}=+17.97$ | $t_{13}=1.50$ | SF 15 | 1.69895 | 30.07 |
|    | $R_{24}=+82.05$ | $s_{11}=3.00$ |      |         |       |
| 84 | $R_{25}=-12.73$ | $t_{14}=7.00$ | LaKN 9 | 1.69100 | 54.71 |
| 85 | $R_{26}=-20.97$ | $t_{15}=1.20$ | SF 10 | 1.72025 | 28.41 |
|    |                 | $s_{12}=30.35$ |     |         |       |
|    | EFL=15-150 mm.  |               |      |         |       |

8. A device according to claim 2 in which the cam grooves are helical and the cam followers bear against only one side of said grooves throughout the travel of the spiders.